United States Patent
Martin et al.

(10) Patent No.: US 11,350,479 B2
(45) Date of Patent: May 31, 2022

(54) COMMUNICATIONS DEVICE, INFRASTRUCTURE EQUIPMENT, MOBILE COMMUNICATIONS NETWORK AND METHODS

(71) Applicant: Sony Corporation, Tokyo (JP)

(72) Inventors: Brian Alexander Martin, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/023,434

(22) Filed: Sep. 17, 2020

(65) Prior Publication Data
US 2021/0007169 A1 Jan. 7, 2021

Related U.S. Application Data

(63) Continuation of application No. 16/194,720, filed on Nov. 19, 2018, now Pat. No. 10,813,158, which is a (Continued)

(30) Foreign Application Priority Data

Feb. 11, 2015 (EP) .................................... 15154659

(51) Int. Cl.
*H04W 4/80* (2018.01)
*H04W 76/23* (2018.01)
(Continued)

(52) U.S. Cl.
CPC ....... *H04W 76/23* (2018.02); *H04W 36/0016* (2013.01); *H04W 36/30* (2013.01);
(Continued)

(58) Field of Classification Search
CPC ....... H04W 84/18; H04W 4/70; H04W 76/15; H04W 92/18; H04W 4/027;
(Continued)

(56) References Cited

U.S. PATENT DOCUMENTS 8,886,113 B2  11/2014 Palanki et al.
2013/0303171 A1  11/2013 Jang et al.
(Continued)

FOREIGN PATENT DOCUMENTS

CN  1778071 A  5/2006
CN  103442397 A  12/2013
(Continued)

OTHER PUBLICATIONS

ITRI, "D2DSS Timing Misalignment for UE on Edge-of-Cell Coverage", 3GPP TSG RAN WG1 Meeting #76bis, R1-141481, Mar. 31-Apr. 4, 2014, 7 pages.
(Continued)

*Primary Examiner* — Tu X Nguyen
(74) *Attorney, Agent, or Firm* — Xsensus LLP

(57) ABSTRACT

A communications device configured to transmit signals representing data to a first in-coverage communications device acting as source relay node for the communications device, the first in-coverage communications device configured to transmit signals to the infrastructure equipment of the mobile communications network, and to receive signals representing the data from the first in-coverage communications device acting as the source relay node. The source relay node is within a coverage area of the infrastructure equipment of the mobile communications network, the source relay node being configured to transmit the signals representing the data received from the communications device to the infrastructure equipment and to transmit the
(Continued)

signals representing the data to the communications device which are received from the infrastructure equipment.

17 Claims, 10 Drawing Sheets

Related U.S. Application Data continuation of application No. 15/548,433, filed as application No. PCT/EP2016/052283 on Feb. 3, 2016, now Pat. No. 10,136,466.

(51) Int. Cl.
*H04W 76/14* (2018.01)
*H04W 36/00* (2009.01)
*H04W 36/30* (2009.01)
*H04W 88/04* (2009.01)
*H04W 8/00* (2009.01)

(52) U.S. Cl.
CPC ........... *H04W 76/14* (2018.02); *H04W 88/04* (2013.01); *H04W 8/005* (2013.01)

(58) Field of Classification Search
CPC ........... H04W 72/042; H04W 52/0245; H04W 52/241; H04W 52/242; H04W 52/245; H04W 52/283; H04W 4/80; H04W 84/20; H04L 67/104; H04B 7/15; H04M 1/72412
See application file for complete search history.

(56) References Cited

U.S. PATENT DOCUMENTS

| | | | |
|---|---|---|---|
| 2013/0316727 A1 | 11/2013 | Edge | |
| 2015/0312788 A1 | 10/2015 | Delsol et al. | |
| 2015/0327201 A1* | 11/2015 | He | H04W 48/16 370/336 |
| 2016/0021526 A1 | 1/2016 | Niu et al. | |
| 2016/0227518 A1 | 8/2016 | Li et al. | |
| 2017/0150330 A1* | 5/2017 | Kim | H04W 48/16 |
| 2017/0295553 A1* | 10/2017 | Lee | H04W 56/001 |
| 2017/0339670 A1 | 11/2017 | Chae et al. | |
| 2018/0139640 A1* | 5/2018 | Chae | H04W 72/1231 |

FOREIGN PATENT DOCUMENTS

| | | |
|---|---|---|
| KR | 20100038559 A | 4/2010 |
| RU | 2523437 C2 | 7/2014 |
| WO | 2012102546 A2 | 8/2012 |
| WO | 2014/051126 A1 | 4/2014 |
| WO | 2014109142 A1 | 7/2014 |
| WO | 2015/015242 A1 | 2/2015 |
| WO | 2015110228 A1 | 7/2015 |
| WO | 2015113689 A1 | 8/2015 |
| WO | 2015113690 A1 | 8/2015 |
| WO | 2015113696 A1 | 8/2015 |
| WO | 2015113719 A1 | 8/2015 |
| WO | 2015113720 A1 | 8/2015 |
| WO | 2016038164 A1 | 3/2016 |

OTHER PUBLICATIONS

Japanese Office Action dated Aug. 19, 2019, issued in corresponding Japanese Patent Application No. 2017-541847.
hARRI hOLMA, ET AL., "L TE for UMTS OFDMA and SC-FOMA Based Radio Access," Wiley, 2009, (4 pages).
Qualcomm Incorporated, "Study on L TE Device to Device Proximity Services," 3GPP TSG RAN Meeting #58, RP-122009. Dec. 6, 2012, (6 pages).
"3rd Generation Partnership Project; Technical Specification Group Radio Access Network; Study on L TE Device to Device Proximity Services; Radio Aspects (Release 12)," Technical Report, 3GPP TR 36 843 V12.0.1, Mar. 2014, (50 pages).
Qualcomm Incorporated, "Work Item Proposal for Enhanced L TE Device to Device Proximity Services." 3GPP TSG RAN Meeting #66, RP-142229, Dec. 8-11, 2014, (8 pages).
Qualcomm Incorporated, "Work item proposal on L TE Device to Device Proximity Services." 3GPP TSG RAN Meeting #63, RP-140518, Mar. 3-6, 2014, (7 pages).
International Search Report dated May 4, 2016 in PCT/EP2016/052283 filed Feb. 3, 2016.
Russian Office Action dated Aug. 1, 2019 in Russian Application No. 2017131382/07(054940).

\* cited by examiner

COMMUNICATIONS DEVICE, INFRASTRUCTURE EQUIPMENT, MOBILE COMMUNICATIONS NETWORK AND METHODS

CROSS-REFERENCE TO RELATED APPLICATIONS

The present application is a continuation of U.S. application Ser. No. 16/194,720, filed Nov. 19, 2018, which is a continuation of U.S. application Ser. No. 15/548,433, filed Aug. 3, 2017 (now U.S. Pat. No. 10,136,466), which is based on PCT filing PCT/EP2016/052283, filed Feb. 3, 2016, and claims priority to European Patent Application 15154659.5, filed in the European Patent Office on Feb. 11, 2015, the entire contents of each of which being incorporated herein by reference.

BACKGROUND

Field of Disclosure

Technical Field of the Disclosure

The present disclosure relates to communications devices and methods for communicating data using communications devices, and in particular to communications devices which are configured to perform device-to-device communications.

Background of the Disclosure

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection. The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced. D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area. Whilst D2D communications techniques can provide an arrangement for communicating between devices when the communications devices are outside a coverage area provided by mobile communications network, the D2D communications techniques can also provide an arrangement for extending an coverage area of the mobile communications network, when one of the communications devices is within the coverage area and another is outside the coverage area.

SUMMARY OF THE DISCLOSURE

According to a first example embodiment of the present technique there is provided a communications device configured to transmit signals to one or more other communications devices via a wireless access interface to perform device-to-device communications and to transmit signals via the wireless access interface to an infrastructure equipment of a mobile communications network when within a radio coverage area of the infrastructure equipment. The communications device includes a receiver configured to receive signals from the one or more other communications devices via the wireless access interface and to receive signals via the wireless access interface from the infrastructure equipment of the mobile communications network when within the radio coverage area of the infrastructure equipment. A controller is configured with the transmitter and the receiver to transmit signals representing the data to a first in-coverage communications device acting as source relay node for the communications device, the first in-coverage communications device being able to transmit signals to the infrastructure equipment of the mobile communications network, and to receive signals representing the data from the first in-coverage communications device acting as the source relay node. The source relay node is within a coverage area of the infrastructure equipment of the mobile communications network, the source relay node being configured to transmit the signals representing the data received from the communications device to the infrastructure equipment and to transmit the signals representing the data to the communications device which are received from the infrastructure equipment. Subject to predetermined conditions, the controller is configured to receive one or more beacon signals from one or more other in-coverage communications devices which can act as a relay node for the communications device when out-of-coverage so that the receiver cannot receive the signals from the infrastructure equipment or transmit the signals to the infrastructure equipment, or to transmit a beacon signal to the one or more other in-coverage communications devices which can act as a relay node for the communications device when out-of-coverage, and to transmit the signals representing the data to one of the other in-coverage communications devices to act as a target relay node for transmitting the data to the infrastructure equipment, or to receive the signals representing the data from one of the other in-coverage communications devices acting as a target relay node which have been received from the infrastructure equipment.

Embodiments of the present technique can provide an arrangement in which, an out-of-coverage communications device, which is using an in-coverage communications device to act as a relay node to communicate data to and/or from an infrastructure equipment can change affiliation from one in-coverage communications device to another.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Conventional Communications System

Figure 1:
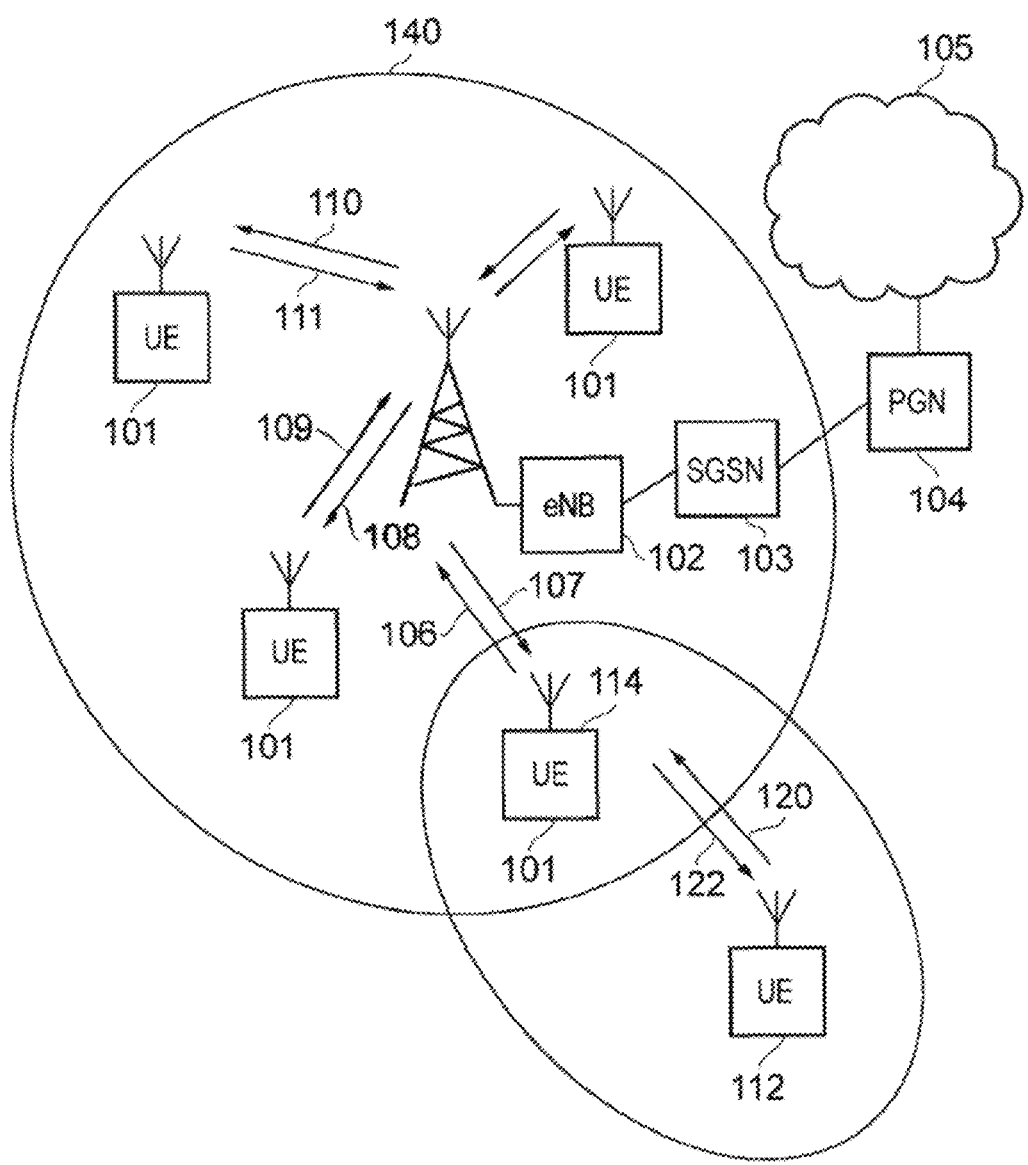
FIG. 1 provides a schematic diagram of a mobile communications system in which in coverage communications devices are communicating via an infrastructure equipment and at least one out-of-coverage communications device is communicating via one of the in-coverage communications devices.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a conventional mobile telecommunications system 100, where the system includes mobile communications devices 101, infrastructure equipment 102, and a core network comprising a serving gateway node 103, a packet data gateway 104 which forms a gateway to an external network 105. The infrastructure equipment 102 may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The infrastructure equipment 102 is communicatively linked via the serving gateway node 103 and the packet data gateway 104 to the external network 105, which may be connected to one or more other communications systems or networks which have a similar structure to that formed from communications devices 101 and infrastructure equipment 102. The core network may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 106 to 111, where arrows 106, 108 and 110 represent downlink communications from the network entity to the communications devices and arrows 107, 109 and 111 represent the uplink communications from the communications devices to the infrastructure equipment 102. The communications system 100 may operate in accordance with any known protocol, for instance in some examples the system 100 may operate in accordance with a 3GPP Long Term Evolution (LTE) standard where the infrastructure equipment 102 may be referred to as a base station or an enhanced Node B (eNodeB(eNB)).

Also shown in FIG. 1 is a line 140 which represents an indication of a maximum range within which radio signals can be communicated to and from the infrastructure equipment or eNB 102. As will be appreciated the line 140 is just an illustration and in practice there will be a great variation in respect of the propagation conditions and therefore the range in which radio signals can be communicated to and from the eNB 102. As shown in FIG. 1, in one example one of the communications devices 112 has moved to an area which is outside the line 140 representing a range within which radio signals can be communicated to and from the eNB 102. According to the present technique the communications terminal 112 which is outside the range of the eNB 102 may still communicate data to and from the eNB 102 but this is achieved by relaying the data via one of the UE's 114 which acts as a relay node to the communications terminal 112.

In accordance with our pending International patent applications numbered PCT/2014/078087, PCT/2014/078093, PCT/2014/079338, PCT/2014/077447, PCT/2014/077396, PCT/2014/079335, the contents of which is incorporated herein by reference, there is provided a device communications technique which allows one or more communications devices to form a group of communications devices which can communicate data between the group of communications devices without being communicated via an eNB. Such an arrangement can operate within or without a coverage area provided by a base station or eNB.

In one example 3GPP have completed a study item entitled "LTE Device to Device Proximity Services-Radio Aspects" described in a technical report TR36.843. According to the present technique therefore an arrangement is provided in which a UE 112 which falls outside a coverage area of an eNB 102 is able to communicate to the eNB 103 using one of the UEs which is within coverage by acting as a relay node. To this end, UEs 112, 114 perform device-to-device (D2D) communications. However, a technical problem addressed by the present technique concerns an arrangement in which an out-of-coverage UE 112 performs a handover to another in-coverage UE 114 which is to act as a relay node.

In a situation in which an out-of-coverage UE is communicating with a mobile communications network via an in-coverage UE acting as a relay node, there are several mobility scenarios which can be considered. After an initial relay selection by an out-of-coverage UE there needs to be a way to select and connect from a source relay UE to a target relay UE. Such an intra relay UE handover or re-selection requires an arrangement in which an out-of-coverage UE discovers the target relay UE. However, since an in-coverage UE acting as a relay node may not always be transmitting a downlink signal, for example a discovery beacon signal, then it may not be possible to make a comparison of measurements from the current or source relay UE node (relay or eNB) and a potential target relay node (relay). This differs from the typical handover from a source eNB to a target eNB, because the eNB always transmits downlink common channels and synchronisation channels, so that the UE can always perform the measurement.

Accordingly a technical problem addressed by the present technique concerns an arrangement in which an out-of-coverage UE changes from one in-coverage UE acting as a relay node to another in-coverage UE acting as a relay. In the following description these will be referred to as a source relay-UE and a target relay-UE.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. In accordance with the present technique, the wireless access interface for both the down-link shown in FIG. 2 and the up-link shown in FIG. 3 can provide a facility for communicating data from a UE to a mobile communications network via the eNB and for communicating data to the UE from the eNB, but can also provide communications resources for performing D2D communications to another communications device without being communicated via the eNB. The down-link and the up-link of the wireless access interface of FIGS. 2 and 3 respectively will now be explained.

Figure 2:
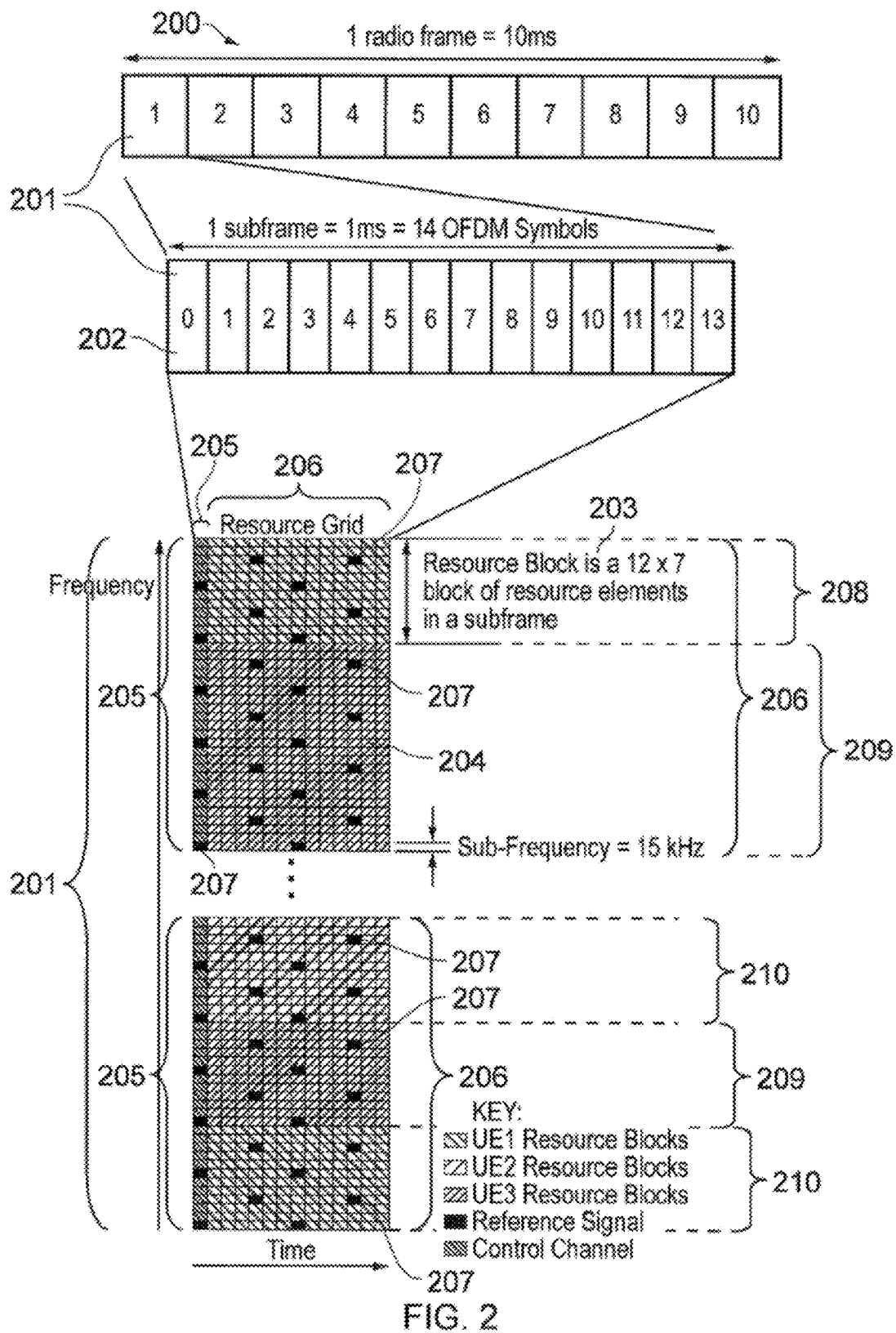
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
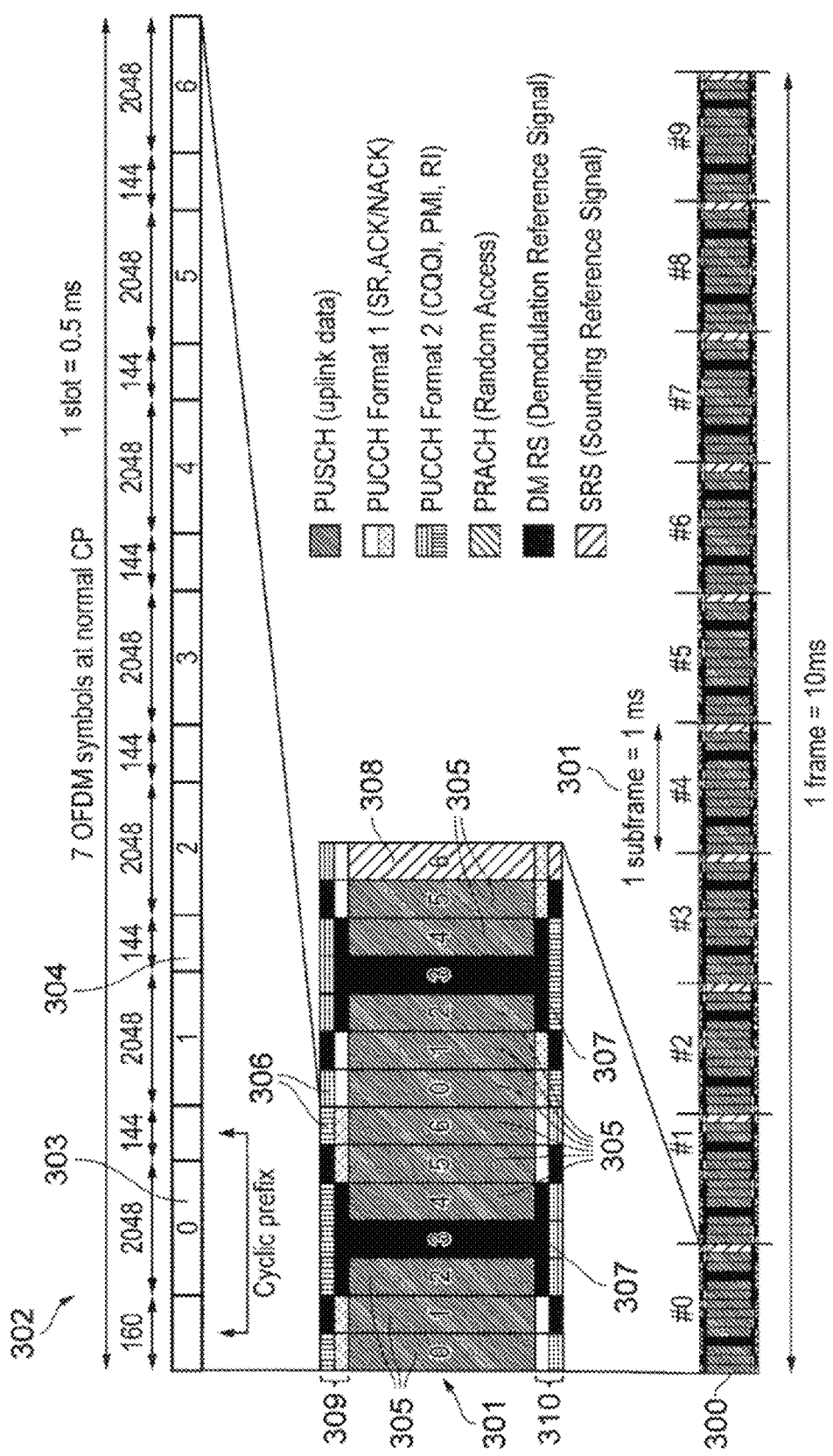
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Supporting an Out-of-Coverage Communications Device

It has previously been proposed to provide some arrangement for device to device communication within standards which define communications systems according to specifications administered by the 3GPP referred to as Long Term Evolution (LTE). These are defined in LTE Release 12 and Release 13 and provide a facility for D2D communications. More generally, a number of possible approaches to the implementation of LTE D2D communications exist. For example, the wireless access interface provided for communications between UEs and eNodeB may be used for D2D communications, where an eNB allocates the required resources and control signalling is communicated via the eNB but user data is transmitted directly between UEs.

In our co-pending International patent applications with the application numbers PCT/2014/078087, PCT/2014/078093, PCT/2014/079338, PCT/2014/077447, PCT/2014/077396, PCT/2014/079335, there is disclosed various techniques for performing D2D communications between devices using the LTE up-link shown in FIG. 3. For example, in the International patent application PCT/2014/079338, there is disclosed an arrangement for performing contentious resolution for D2D communications. Similarly, an arrangement for allocating resources using a scheduling assignment messages transmitted in a scheduling assignment region of an uplink transmission frame is disclosed in International patent application PCT/2014/078093. An arrangement in which communications devices of limited capability which may form machine to machine communications devices can be arranged to perform device to device communications within a limited set of resources (referred to as a virtual carrier) as disclosed in International patent application PCT/2014/077447. Furthermore, an arrangement for identifying resources which can be used for device to device communications between a group of communications devices is disclosed in International patent application PCT/2014/079335, the content of all of the above International patent applications are incorporated into the present application by reference. As will be appreciated therefore these co-pending international patent applications disclose an arrangement for an out-of-coverage UE 112 to communicate on a forward or up-link to an in-coverage UE acting as a relay node 114, represented by an arrow 120 in FIG. 1 and to communicate on a reverse or down-link from the relay-UE 114 to the out-of-coverage UE 112 as represented by an arrow 122 in FIG. 1.

Figure 4:
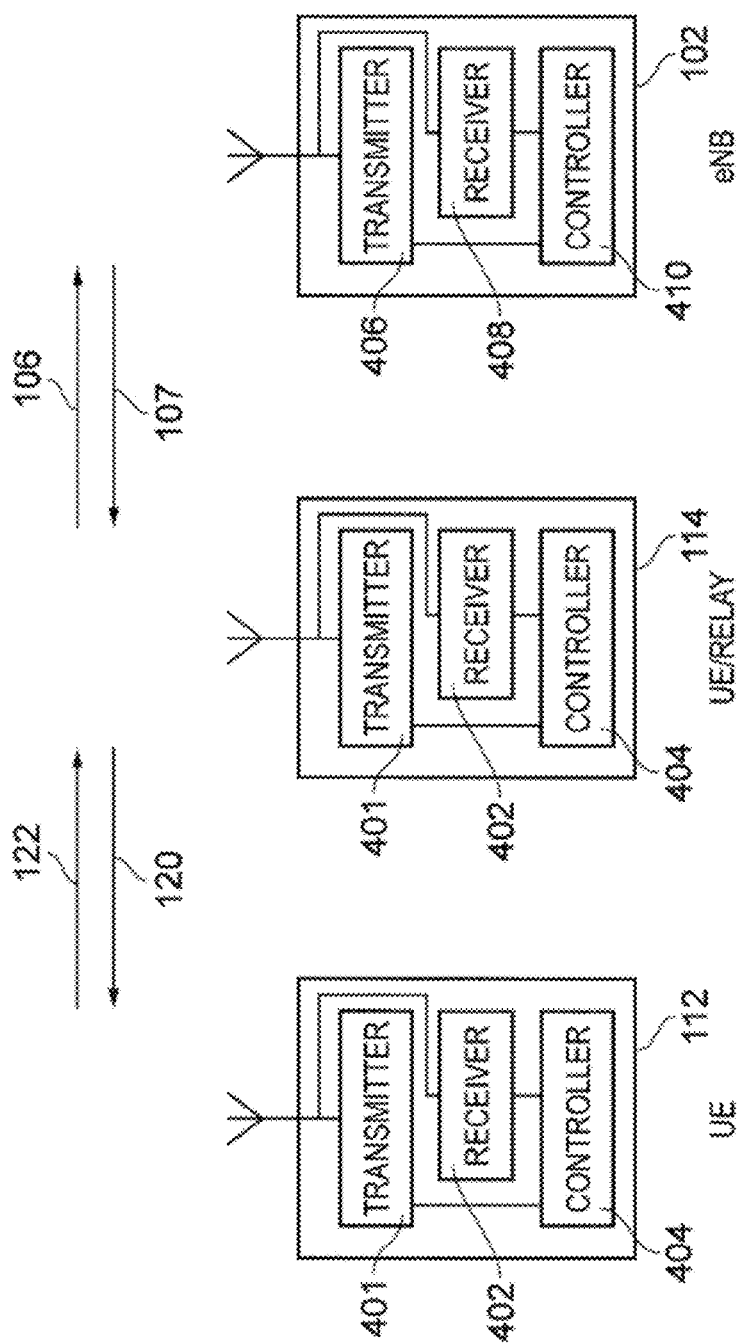
FIG. 4 provides a schematic diagram of an out-of-coverage communications device communicating on an uplink and a downlink with an infrastructure equipment via an in-coverage communications device.

FIG. 4 shows a schematic block diagram of a communications path between the out of coverage UE 112 and the eNB 102, via the in coverage UE acting as a relay node 114. As shown in FIG. 4 the out of coverage UE 112 includes a transmitter 401 a receiver 402 and a controller 404 to control the transmission and reception of signals to the in coverage UE 114 acting as a relay node. The up-link signals are represented by an arrow 120 which corresponds to that shown in FIG. 1 and the downlink signals are shown by an arrow 122, which corresponds to that shown in FIG. 1. The relay UE 114 could be a conventional UE and so includes also a transmitter 401 receiver 402 and a controller 404. The in coverage UE acting as a relay node 114 operates in accordance with a conventional arrangement but transmits signals on the uplink as shown by an arrow 107 and receives signals on the downlink as represented by an arrow 106 to and received from the eNB 102 respectively. The eNB 102 includes a transmitter 404 a receiver 408 and a controller 410 which may include a scheduler for scheduling the transmission and reception of signals on the downlink and the uplink in accordance with the wireless access interface shown in FIGS. 2 and 3.

Figure 5:
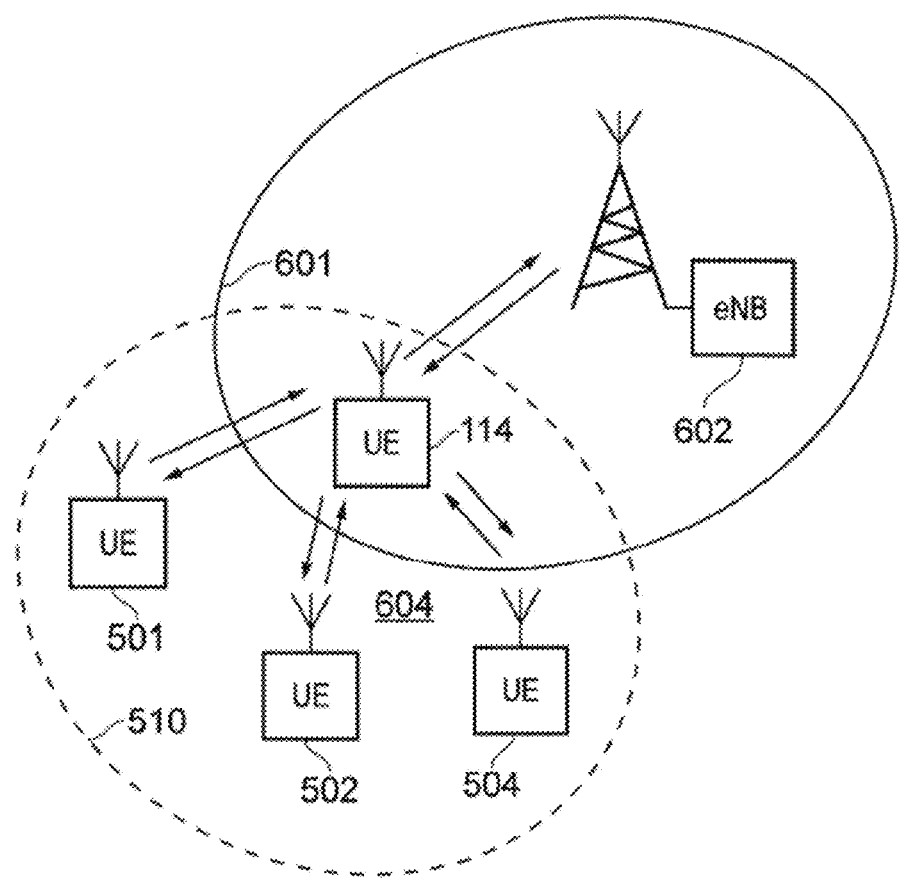
FIG. 5 provides a schematic block diagram illustrating an arrangement in which a plurality of communications devices form a group which perform device-to-device communications.

As explained above, embodiments of the present technique can provide an arrangement for extending the coverage of an eNB, by utilising D2D communications techniques. An example application is presented in FIG. 5. In FIG. 5, a plurality of communications devices 501, 502, 504, 114 form a group of communications devices 604 for which D2D communications is desired for the reasons explained above. As represented in FIG. 5, the communications devices 501, 502, 504, are outside a coverage area represented by a line 601 of an eNB or base station 602. As such the eNB 602 cannot form or control any of the communications between the out of coverage communications devices 501, 502, 504. According to the present technique a plurality of communications devices 604 may perform D2D communications whether they are in coverage or out of coverage of an eNB 102. As shown in FIG. 5 the group of devices 604 includes UEs 501, 502, 504, which are out of coverage of the eNB 602 with one of the UEs 114 within coverage. To this end, an in coverage UE 114 is operating to act as a relay node. Accordingly, in one example, the out of coverage UEs 501, 502, 504 may form a virtual cell with the relay node or in coverage UE 114 acting as a base station for each of these out of coverage UEs 501, 502, 504. Accordingly, a broken or dash line 510 illustrates a coverage area of a virtual cell formed by the in coverage UE 114. In one example, all control plane signalling is communicated to the eNB 102 via the in coverage UE 114 acting as a relay node so that the control plane is managed by the virtual cell.

As explained above, embodiments of the present technique can provide an arrangement in which an out-of-coverage UE, which is communicating via one source and in-coverage UE acting as a relay UE can identify another target in-coverage UE to act as a relay node in place of the source relay UE, when the source relay UE can no longer act as a relay node because the communications link with that source relay UE is no longer viable. Accordingly embodiments of the present technique can provided an arrangement in which an out-of-coverage UE can change affiliation that is perform a hand over from one in coverage UE acting as a relay node to another. Conventionally UE's perform measurements of beacon signals transmitted by base stations of eNBs in order to determine which eNB provides a better link quality where a beacon signal received from a currently used base station falls below a pre-determined level. Embodiments of the present technique can provide in one example:

Measurements of a received signal are made by or reported to the current or source relay UE.

The source relay UE then will trigger potential target relays to transmit a handover discovery beacon, either directly or via the eNB.

The out-of-coverage UE then performs measurements of potential target relay UE and reports the results to the source relay UE.

Handover to a target relay is then triggered based on the reported measurements.

Alternatively no measurements are reported, and the out-of-coverage UE performs a target relay UE reselection autonomously.

According to an alternative arrangement embodiments of the present technique can provide:

Measurements are made by the out-of-coverage UE of a beacon signal transmitted from a current or source relay UE.

The out-of-coverage UE triggers a beacon signal transmission when measurements are below a threshold.

In-coverage UEs which can act as potential target relay UEs and the current source relay UE monitor for the beacon signal transmitted by the out-of-coverage UE. All of the in-coverage UE, which can act as a relay UE can perform measurements of the out-of-coverage UE beacon signal and report the results to the eNB.

Handover to a target relay UE is then triggered based on the reported measurements of the beacon signal from the out-of-coverage UE measured by the in-coverage UEs which can act as a new or target UE.

A handover command may be sent by the source relay UE, or another approach could be to send a "PULL" message from the target relay UE, which is almost like a reselection but with the initial access message coming from the network relay side instead of the out-of-coverage UE.

Intra-MME/Serving Gateway Handover

Figure 6:
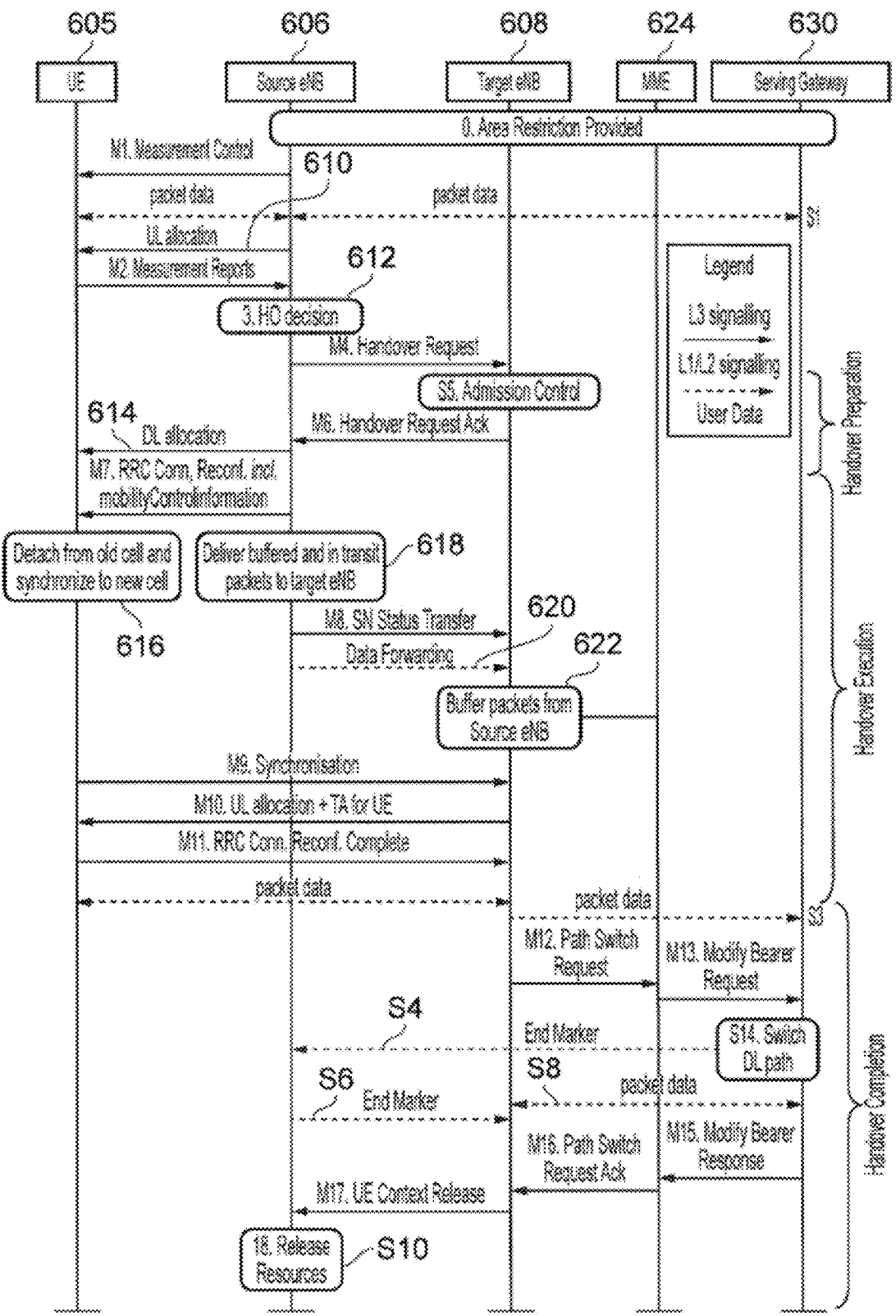
FIG. 6 is an illustrative representation of a message exchange flow diagram for an intra-Mobility Management Entity (MME)/Serving Gateway handover process according to an conventional arrangement of an LTE standard.

In order to provide a better appreciation of example embodiments of the present technique a brief description of a conventional handover technique by a UE from a source eNB 606 to a target eNB 608 is provided in the following paragraphs with reference to FIG. 6. FIG. 6 presents a message flow diagram of a current handover procedure for LTE between eNBs 606, 608. As shown in FIG. 6 a UE 605 first receives a measurement control message M1 and then performs packet data transmissions to and from the UE 605 shown by an operation S1. In an uplink allocation message the source eNB 606 transmits an allocation of resources to the UE 605. The UE 605 after performing measurements transmits a measurement report message to the source eNB 606. In a process step 612 the UE determines whether or not to handover to a target base station in this case the target eNB 608. The source eNB 606 then transmits a handover request message in a message M4 and the target eNB 608 performs an admission control step S5. The target eNB 608 transmits a handover request acknowledgement M6 to the source eNB 606 which then transmits a downlink allocation message 614 to the UE 605. An RRC collection re-confirmation and mobility control information is then transmitted by the source eNB 606 to the UE 605 in preparation former handover in a message M7. In steps 616, 618 and the UE 605 detaches from the old cell and synchronises with the new cell and buffers data for transmission via the target eNB. In the message M8 the source eNB 606 transmits a status transfer and follows by data forwarding in a transmission step 620. The target eNB 608 then buffers packets from the source eNB 608 for the downlink transmission 622 under instruction from the MME 624. The UE then transmits a synchronisation message M9 and receives an uplink allocation of resources the message M10 which is acknowledged by an RRC connection confirmation repeat message M11. In process steps S3 the eNB transmits data packets to and from the target eNB to the serving gateway. The target eNB 608 then transmits a path switch request to the MME 624 which transmits a modified bearer request to the serving gateway 630 in a message M13. In a step S14 the serving gateway then switches the downlink path which is transmitted to the source eNB 601 in a message S4. The source eNB then transmits an end marker message to the target eNB 602 in a step S6 and the data packets are transmitted from the target eNB to the serving gateway S8. The serving gateway 630 then transmits a modifying bearer request message M15 to the MME 624 which then transmits a path switch request acknowledgement message M16 to the target eNB 608 and the target eNB 608 transmits a UE context release message M17 to the source eNB 606. The source eNB 606 then performs a release resources process in step S10.

As will be appreciated from the flow diagram shown in FIG. 6 now several steps and processes which are conventionally formed in connection with a handover from a source eNB 606 to the target eNB 608. A technical problem is then presented because a UE which is constructed to operate and communicate via the wireless access interface shown in FIGS. 2 and 3 must be adapted to perform a handover process from one relay node to another. Furthermore, the relay nodes may themselves be fluctuating because they maybe mobile so that the group of UEs which are out-of-coverage and in coverage maybe dynamically changing as these UEs move around. Therefore according to the present technique, handover between relay UEs should follow a similar procedure, to that shown in FIG. 6, with the main two differences being that the D2DSS needs to be triggered so that the UE can perform measurements (before step 1 above) and the signalling between the UE and the eNB needs to be relayed, so that a source and a target are relay UEs, each controlled by a host eNB.

Figure 10:
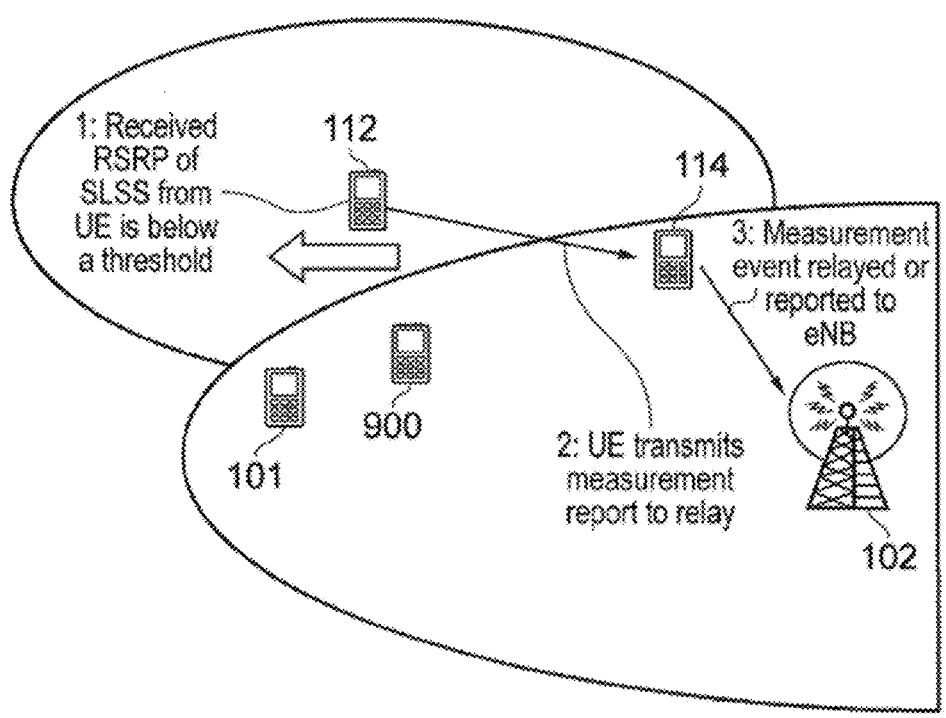
FIG. 10 is a schematic representation of an alternative process to the example process shown in FIG. 7.
Figure 11:
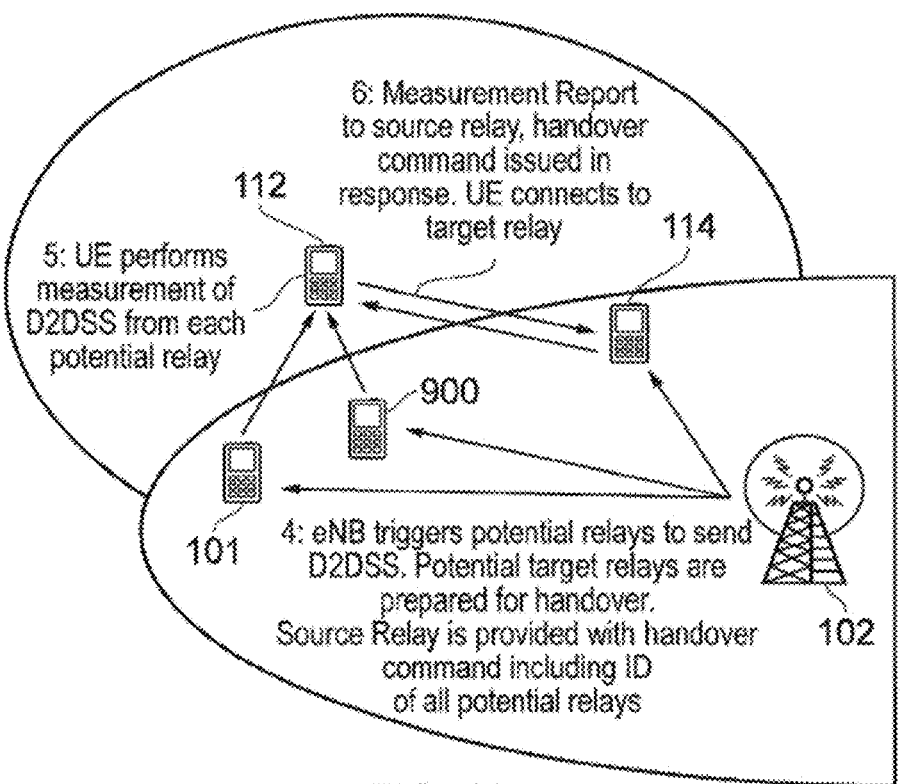
FIG. 11 is a schematic representation of a further part of the alternative process shown in FIG. 10.
Figure 12:
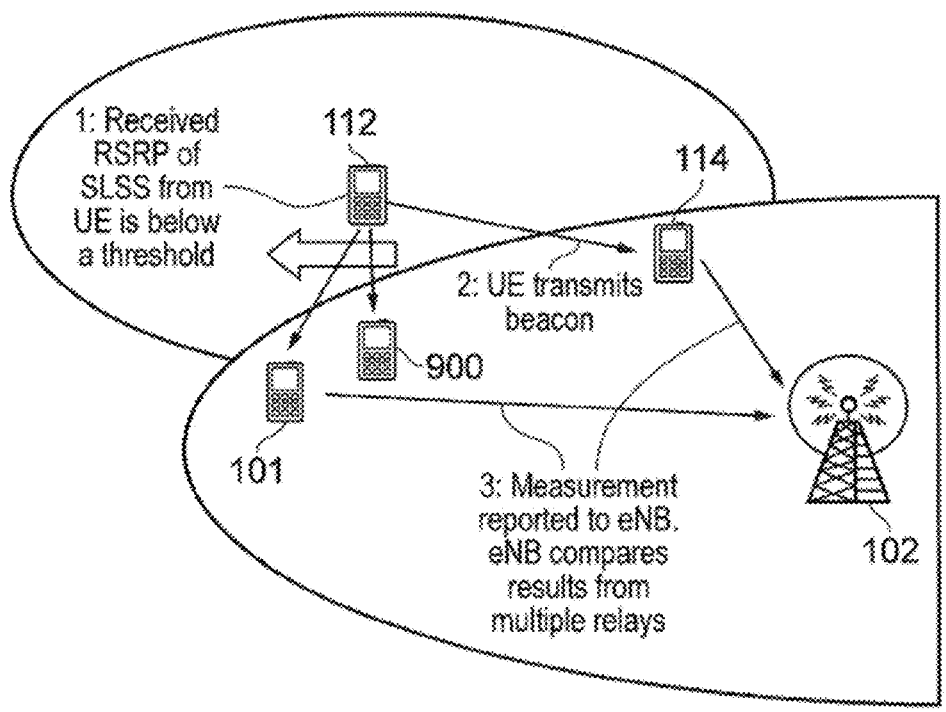
FIG. 12 is a schematic representation of part of another example process in which an out-of-coverage communications device changes an affiliation for communicating data to an infrastructure equipment from one in-coverage communications device acting as a source relay node to another in-coverage communications device acting as a target rely node.

The present technique therefore provides an arrangement which allows an out-of-coverage UE 112 to select a different in-coverage UE to act as a relay node in accordance with a best available communications path to and from that UE. In one example, as represented in FIGS. 7, 8, 9, 10 and 11, the current in coverage UE acting as a relay node operates the trigger potential targets to act as relay nodes to transmit a handover discovery beacon which can be detected by the UE. As a second example as shown in FIGS. 10, 11 and 12 the out of coverage UE itself triggers a beacon signal transmission when measurements of the current source relay UE fall below a pre-determined threshold. These embodiments will now be explained in the following sections:

Triggering of Relay D2DSS for Handover Measurements

Figure 7:
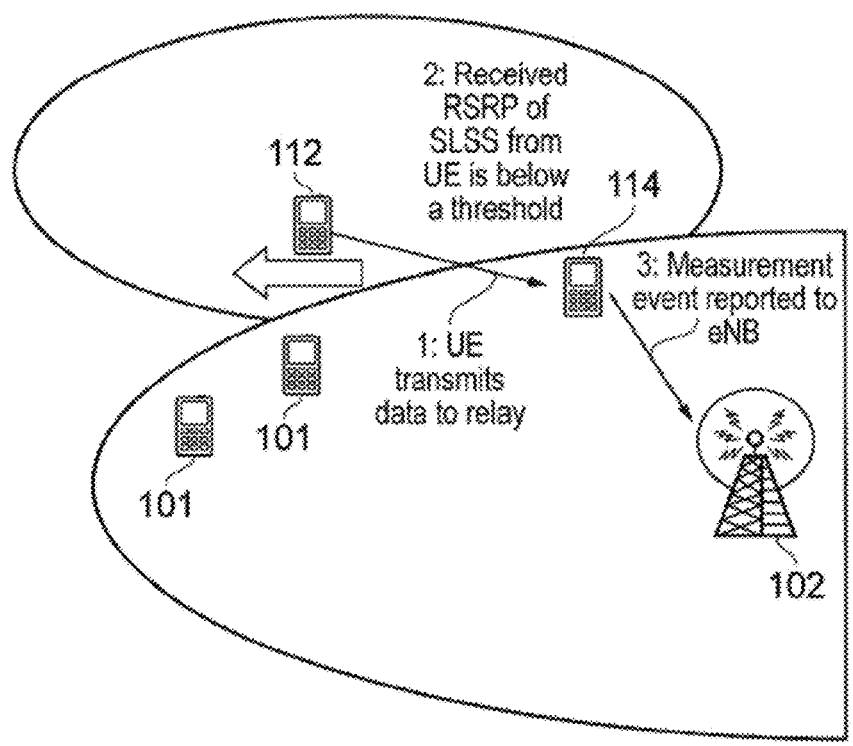
FIG. 7 is a schematic representation of part of an example process in which an out-of-coverage communications device changes an affiliation for communicating data to an infrastructure equipment from one in-coverage communications device acting as a source relay node to another in-coverage communications device acting as a target rely node.

FIG. 7 provides an example illustration of an embodiment of the present technique, which is applicable to a handover between a source and target relay UE, for the Rel-13 UE-network directed relay case.

In step 1, the UE sends a device to device synchronisation signal (D2DSS) and data to an in-coverage UE 114 acting as a relay node (relay UE). In step 2 the relay UE 114 performs measurements of the received D2DSS, such as a received signal strength indication. In one example the relay UE 114 may send the D2DSS, and the out of coverage UE 112 performs measurements of the D2DSS transmitted by the relay UE 114, and then reports any measurements such as the received signal strength indication to the relay UE 114 along with data being transmitted. In accordance with the present technique, an arrangement is therefore provided to ensure that the radio quality is measured on the link between the out-of-coverage UE 112 and the relay UE 114.

In step 3 the relay UE 114 will then report the measurement back to the eNB 102. According to the above explanation steps 1, 2 and 3 are compatible with a conventional LTE operation in that the UE first performs measurements on the current serving cell, and reports back when the received signal strength of the measure signal such as the beacon signal goes below a threshold. This may then trigger step 1 in FIG. 7. Other alternative steps include performing intra-frequency or inter-frequency measurements during step 1, and reporting event A3, in accordance with a conventional arrangement for example. The level of reported neighbour cells and frequencies may be taken into account when making the decision whether to activate relays (for example, relays are activated only when there are no suitable eNB neighbour reported for handover). However inter-frequency measurements may be enabled based on event A2.

Figure 8:
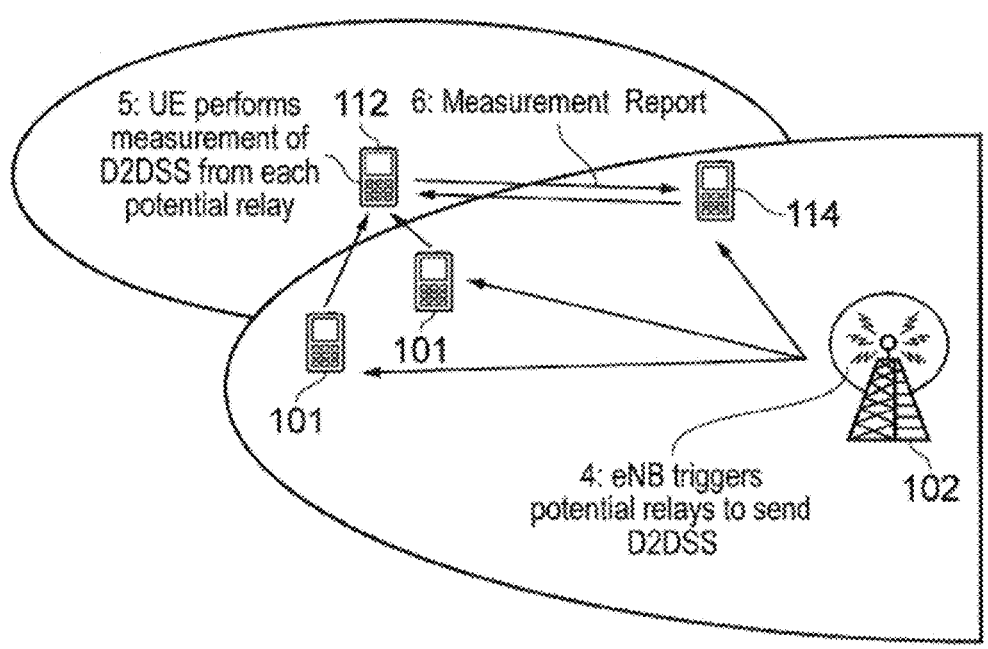
FIG. 8 is a further part of the example process of FIG. 7.

As shown in FIG. 8, in step 4 the eNB 102 commands potential in coverage UEs acting as relay nodes to start sending a D2DSS, for example using RRC signalling. In step 5 the UE may then receive a measurement command from the source relay UE 114 to start measurements. In one example, measurements may have been started automatically, which would involve less signalling overhead and delay. The out-of coverage UE 112 may be provided with an "active set" and "monitored set" of relays formed from in-coverage UEs for example. In step 5 the out-of-converge UE 112 reports measurement results back to the source relay UE 114. In one example the reporting back to the relay UE 114 may be event triggered, such as upon detecting that another relay has become better than the source relay UE, or it may be a one-shot or periodic measurement). Relay UEs are identified for example by using the D2DSS index, an identifier, or code which uniquely identifies the relay within the cell (eNB).

Figure 9:
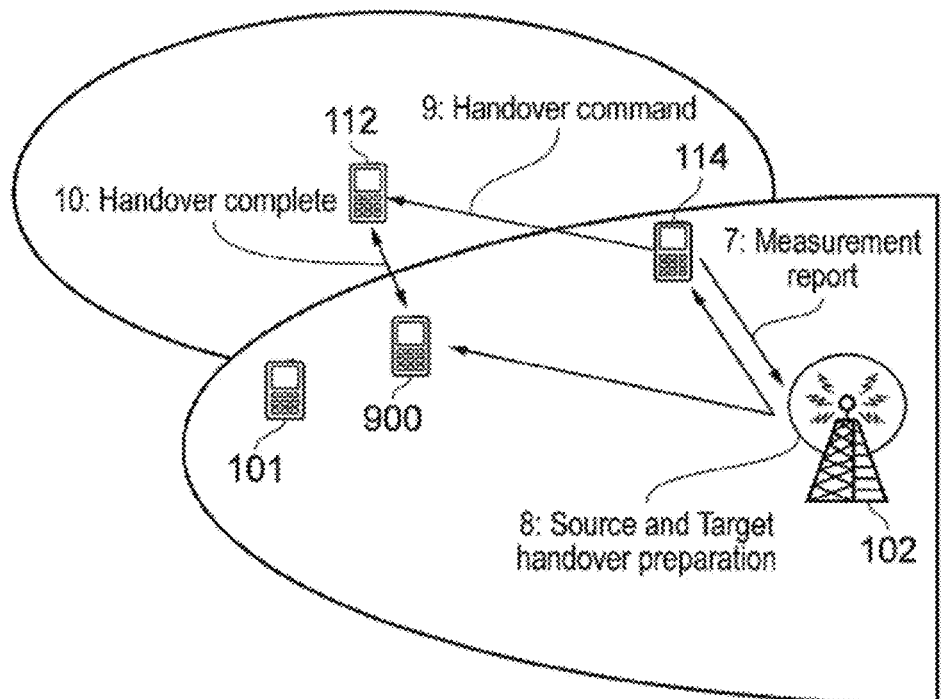
FIG. 9 is a further part of the example process of FIG. 7.

As shown in FIG. 9, in step 7 the measurement report, which has been received by the source relay UE 114 is communicated back to the eNB 102 either by relaying the measurement report message from the out-of-coverage UE 112 directly, or by simply indicating the newly identified target relay UE. This later example indicates that the source relay UE 114 or the out-of-coverage UE 112 has already selected the target relay UE. Step 8 configures the target relay UE to be prepared to connect to the out-of-coverage UE 112, and provides the source relay UE 114 with the handover command.

At step 10 the UE has selected the new relay UE 900 (as target relay UE) and the procedure is complete. In one example the out-of-coverage UE 112 may provide the new relay UE 900 with a "handover complete" message similar to inter-eNB handover.

As an alternative example, step 8 may be done (more efficiently) in advance as part of step 4, in order to reduce signalling and delay. That is to say that a potential target relay UE 114 may in one example embodiment be arranged to prepare to act as a new relay UE 900 before being instructed to transmit the D2DSS. If this is the case then the measurement report in step 7 does not need to be sent to the eNB but rather the handover command in step 9 is sent by the source relay UE 114 in response to the measurement report in step 6. This example arrangement is illustrated by the diagram shown in FIGS. 10 and 11.

As can be understood from FIGS. 10 and 11, the transmission of the relay D2DSS for handover measurements is triggered with for handover preparation in advance. As can be seen in FIG. 10, the out-of-coverage UE 112 in step 1 detects that the received signal strength (RSRP) has fallen below a predetermined threshold, which then triggers a measurement report in step 2 to the source relay-UE 114, which is reported to the eNB 102 in step 3. The preparation for handover in advance provides a more efficient method of changing the relay node from source 114 to target 900, by reducing signalling with the eNB 102 and also delay. As shown in FIG. 11, in one example there could be an automatic switch from the source relay-UE 114 to the target relay UE 900, which is similar to cell reselection, rather than to perform step 6, which is similar to handover. This may further reduce the delay, and since all of the target relay UEs are prepared to connect to the UE, this automatic selection of the new relay-UE 900 is possible. The transfer of any core network context information would then be dealt with entirely by the eNB in combination with other network entities. The new relay-UE 900 would in effect treat this as a newly connecting UE. However in some examples an initial phase of establishing the context information may be different due to prior knowledge of the out-of-coverage UE 112 having been provided by the eNB 102. Once the out-of-coverage UE 112 selects a new relay UE 900 and provides an indication to the new relay UE 900, the eNB 102 can transfer the context based on knowledge of the source relay-UE 114 within the eNB 102 and core network. In summary the two approaches identified above are:

cell automatic reselection type arrangement in which an out-of-coverage UE automatically selects a new relay-UE in accordance with a received signal strength of the D2DSS, without instruction from the eNB; or handover procedure in which the eNB directs the UE to handover to a target relay-UE.

Each of these options provides different advantages. For example, although the cell reselection procedure may provide an approach with less signalling overhead, it may be preferable to use the handover-like procedure in order to establish appropriate context information.

Transmission by Out-of-Coverage UE of D2DSS for Handover Measurements

According to another embodiment of the present technique there is provided an arrangement in which an out-of-coverage UE 112 transmits a beacon signal, in preparation for a change of relay-UE from an in-coverage UE 114, rather than the beacon signal (D2DSS) being transmitted by the candidate relay UEs. According to this example an advantage is provided in potentially reducing a delay and an amount of signalling message between the source relay UE 114 and out-of-coverage UE 112. The communication of the signalling messages may be on a potentially poor radio link. However the reduction in delay and signalling messages transmitted on a potentially poor radio link may be at the expense of increased signalling messages, which are required to be transmitted between any potential relays 101, 900 and the eNB 102, which are the measurement reports. This example embodiment may be more robust since the additional signalling would be performed only by relay UEs 101, 900 in coverage of an eNB 102, which may be less error prone than sending measurement reports via a source relay UE 114 with respect to which the out-of-coverage UE 112 is moving away from. Only the relay UEs 101, 900, which are measuring a good signal strength of the beacon signal (D2DSS) transmitted from the out-of-coverage UE 112 need to be reported. Therefore a signalling overhead can be reduced. The reselection-type approach would not be possible, however it might be possible for a target relay to connect to the UE after UE loses communication with the source relay.

Figure 13:
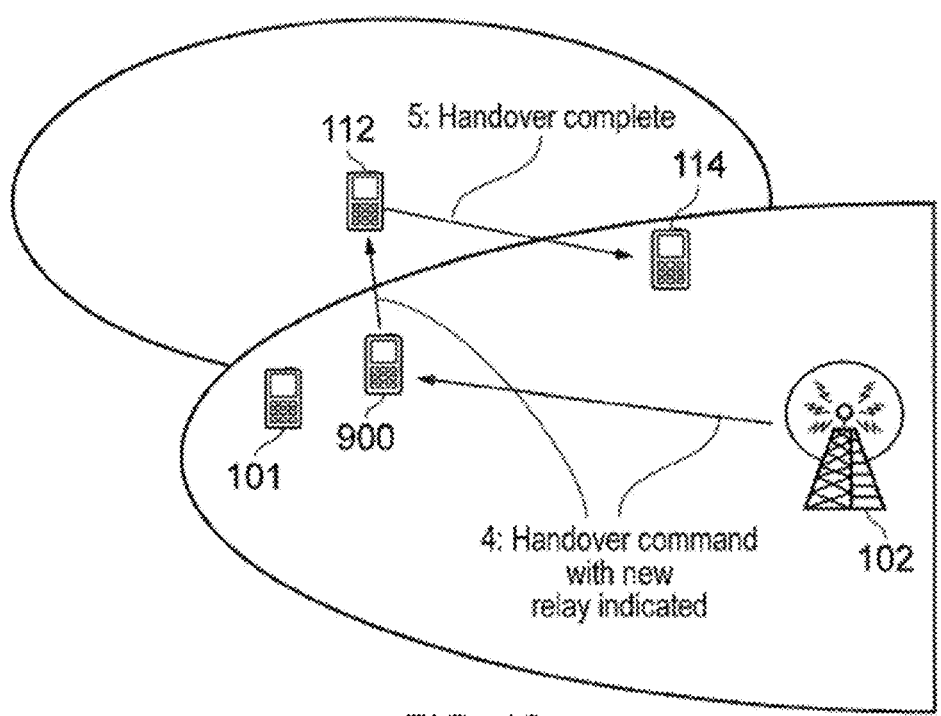
FIG. 13 is a further part of the example process shown in FIG. 12.

FIGS. 12 and 13 provide an illustrative embodiment of the present technique. As shown in FIG. 12 as a first step 1, the out-of-coverage UE 112 detects that a received signal strength of a reference power has fallen below a predetermined threshold, which therefore triggers a process in which the out-of-coverage UE 112 begins to select a new relay UE. In contrast to the example embodiment explained above with reference to FIGS. 7 to 11, the out-of-coverage UE 112 then transmits a beacon signal in step 2 to each of the in coverage UEs 604 which could act as relay node. In step 3, the measured reference signal received power (RSRP) representing a signal strength of the beacon signal received from the out-of-coverage UE 112 is reported by each of the available in-coverage UEs to the eNB 102. The eNB then compares the results from each of the in-coverage UEs and selects one of these to be the target relay-UE 900.

As shown in FIG. 13, in step 4, the eNB 102, having determined which of the in-coverage UEs should act as a relay-UE 900, transmits a handover command to the target relay UE 900. In accordance with process step 4, the handover command is sent via the target relay UE 900, rather than the source relay-UE 114, in order to address a potential loss of coverage from the source relay UE 114.

Accordingly, this process would differ from a conventional handover command because the out-of-coverage UE 112 can receive the handover command in communications resources of the down-link which are already known. For example the same down-link communications resources that were configured for the source relay UE 114, can be used for the target relay UE 900 using something like a "PULL" message to complete the relay change/handover. According to this example embodiment, a reduction in an amount of D2D communications resources which may be required for beacon signal transmission may be achieved, because only the out-of-coverage UE 112 transmits a beacon signal rather than multiple in-coverage UEs which can act as relay nodes. Furthermore a reduction in amount of signalling messages may be achieved on D2D communications.

SUMMARY

From the above explanation it will be appreciated that embodiments of the present technique can provide:
Methods for switching on multiple target relay beacon signals for use with measurement evaluation for handover/relay reselection.
Relays do not need to continuously send the D2DSS/beacon, which saves resources and battery in the relay.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

The following numbered paragraphs provide further example aspects and features of the present technique:

Paragraph 1. A communications device, comprising
a transmitter configured to transmit signals to one or more other communications devices via a wireless access interface to perform device-to-device communications, the wireless access interface being provided for transmitting signals to an infrastructure equipment of a mobile communications network when within a radio coverage area of the infrastructure equipment,
a receiver configured to receive signals from the one or more other communications devices via the wireless access interface, the wireless access interface being provided for receiving signals from the infrastructure equipment of the mobile communications network when within the radio coverage area of the infrastructure equipment, and
a controller for controlling the transmitter and the receiver to transmit or to receive the signals via the wireless access interface to transmit or to receive data represented by the signals, and subject to predetermined conditions, the controller is configured is configured in combination with the transmitter and the receiver
to receive one or more beacon signals from one or more other in-coverage communications devices which can act as a relay node for the communications device when out-of-coverage so that the receiver cannot receive the signals from the infrastructure equipment or transmit the signals to the infrastructure equipment, or
to transmit a beacon signal to the one or more other in-coverage communications devices which can act as a relay node for the communications device when out-of-coverage, and
to transmit the signals representing the data to one of the other in-coverage communications devices to act as a target relay node for transmitting the data to the infrastructure equipment, or
to receive the signals representing the data from one of the other in-coverage communications devices acting as a target relay node which have been received from the infrastructure equipment.

Paragraph 2. A communications device according to paragraph 1, wherein the controller is configured with the transmitter and the receiver
to transmit signals representing the data to a first in-coverage communications device acting as source relay node for the communications device, the first in-coverage communications device being able to transmit signals to the infrastructure equipment of the mobile communications network, and
to receive signals representing the data from the first in-coverage communications device acting as the source relay node, the source relay node being within a coverage area of the infrastructure equipment of the mobile communications network, the source relay node being configured to transmit the signals representing the data received from the communications device to the infrastructure equipment and to transmit the signals representing the data to the communications device which are received from the infrastructure equipment.

Paragraph 3. A communications device according to paragraph 1 or 2, wherein the controller is configured
to compare the received one of beacon signals, and
to select one of the in-coverage communications devices to act as a target relay node.

Paragraph 4. A communications device according to paragraph 3, wherein the controller is configured in combination with the transmitter to transmit an indication to the in-coverage communications device acting as the relay node for communicating to the infrastructure equipment of the selected one of the in-coverage communications devices to act as the target relay node.

Paragraph 5. A communications device according to paragraph 4, wherein the controller is configured in combination with the transmitter to transmit the indication of the selected one of the in-coverage communications devices to act as the target relay node to the selected one of the in-coverage communications devices for transmission by the selected one of the in-coverage communications devices to the infrastructure equipment.

Paragraph 6. A communications device according to paragraph 4, wherein the controller is configured in combination with the transmitter to transmit the indication of the selected one of the in-coverage communications devices to act as the target relay node to the first of the in-coverage communications devices for transmission by the first of the in-coverage communications devices to the infrastructure equipment.

Paragraph 7. A communications device according to paragraph 1 or 2, wherein the controller is configured in combination with the transmitter
- to transmit a relative strength of the beacon signals received from the one or more other in-coverage communications devices which can act as relay nodes to the infrastructure equipment via the first in-coverage communications device acting as the source relay node, and
- to receive from the infrastructure equipment via the first in-coverage communications device acting as the source relay node an indication of one of the other in-coverage communications devices which should act for the communications device as a target relay node.

Paragraph 8. A communications device according to any of paragraphs 1 to 7, wherein the predetermined conditions include a quality of communicating the data received from or transmitted to the first in-coverage communications device.

Paragraph 9. A communications device according to any of paragraphs 1 to 7, wherein the predetermined conditions include a signal strength of a signal received from the first of the in-coverage communications device falling below a predetermined threshold.

Paragraph 10. A communications device, comprising
a transmitter configured to transmit signals to one or more other communications devices via a wireless access interface to perform device-to-device communications and to transmit signals via the wireless access interface to an infrastructure equipment of a mobile communications network when within a radio coverage area of the infrastructure equipment,
a receiver configured to receive signals from the one or more other communications devices via the wireless access interface and to receive signals via the wireless access interface from the infrastructure equipment of the mobile communications network when within the radio coverage area of the infrastructure equipment, and
a controller for controlling the transmitter and the receiver to transmit or to receive the signals via the wireless access interface to transmit or to receive data represented by the signals, and the transmitter and the receiver are configured with the controller
to receive an indication that the communications device is an in-coverage communications device to act as a target relay node for an out-of-coverage communications device,
to receive signals representing up-link data from an out-of-coverage communications device in accordance with a device to device communications for the infrastructure equipment of the mobile communications network, and
to transmit signals representing the up-link data to infrastructure equipment, or
to receive signals representing down-link data from the infrastructure equipment, and
to transmit signals representing the down-link data to the out-of-coverage communications device in accordance with a device to device communications.

Paragraph 11. A communications device according to paragraph 10, wherein the indication that the communications device is an in-coverage communications device to act as a relay node for the out-of-coverage communications device comprises receiving up-link data from the out-of-coverage communications device, the out-of-coverage communications device having selected the communications device as a target relay node.

Paragraph 12. A communications device according to paragraph 10, wherein the indication that the communications device is an in-coverage communications device to act as a relay node for the out-of-coverage communications device comprises receiving the indication from the infrastructure equipment.

Paragraph 13. A communications device according to paragraph 10, 11 or 12, wherein controller in combination with the transmitter and the receiver is configured
- to receive a beacon signal transmitted by the out-of-coverage communications device,
- to determine a signal strength of the received beacon signal, and
- to transmit an indication of the signal strength of the received beacon signal to one of the out-of-coverage communications device or the infrastructure equipment.

Paragraph 14. A communications device according to paragraph 10, 11 or 12, wherein controller in combination with the transmitter and the receiver is configured
- to receive a request to transmit a beacon signal from the out-of-coverage communications device,
- to transmit the beacon signal to the out-of coverage communications device in accordance with a device to device communications protocol, the communications device being selected to act as the target relay node for an out-of-coverage communications device by the out-of-coverage communications device or the infrastructure equipment in accordance with the beacon signal received by the out-of-coverage communications device.

Paragraph 15. A communications device, comprising
a transmitter configured to transmit signals to one or more other communications devices via a wireless access interface to perform device-to-device communications and to transmit signals via the wireless access interface to an infrastructure equipment of a mobile communications network when within a radio coverage area of the infrastructure equipment,
a receiver configured to receive signals from the one or more other communications devices via the wireless access interface and to receive signals via the wireless access interface from the infrastructure equipment of the mobile communications network when within the radio coverage area of the infrastructure equipment, and
a controller for controlling the transmitter and the receiver to transmit or to receive the signals via the wireless access interface to transmit or to receive data represented by the signals, and the transmitter and the receiver are configured with the controller
to receive signals representing up-link data from an out-of-coverage communications device in accordance with a device to device communications for the infrastructure equipment of the mobile communications network, and
to transmit signals representing the up-link data to infrastructure equipment, or
to receive signals representing down-link data from the infrastructure equipment, and
to transmit signals representing the down-link data to the out-of-coverage communications device in accordance with a device to device communications to act as a source relay to the out-of-coverage communications device, subject to predetermined conditions, to transmit a request to one or more other in-coverage communications devices or the infrastructure equipment to transmit a beacon signal to the out-of-coverage communications device, so that, based upon a signal quality of the beacon signal received from the one or more other in-coverage communications devices, one of the one or more other in-coverage communications devices can be selected to act as a target relay for the out-of-coverage communications device.

Paragraph 16. A communications device according to paragraph 15, wherein the predetermined conditions include a signal quality of one or more signals received by the receiver or an indication of a signal quality, received by the receiver of a signal transmitted by the transmitter and received by the out-of-coverage communications device, falling below a predetermined threshold.

Paragraph 17. A communications device according to paragraph 15 or 16, wherein the controller is configured in combination with the transmitter and the receiver to receive an indication, from the out-of-coverage communications device of a received signal strength of the beacon signal, received by the out-of-coverage communications device from each of the one or more other in-coverage communications devices, and to transmit each of the indications of the received signal strength of the beacon signal to the infrastructure equipment to select one of the one or more in-coverage communications devices to act as a target relay node.

REFERENCES

[1] LTE for UMTS: OFDMA and SC-FDMA Based Radio Access, Harris Holma and Antti Toskala, Wiley 2009, ISBN 978-0-470-99401-6.
[2] "LTE Device to Device Proximity Services—Radio Aspects" described in RP-122009.
[3] 3GPP technical report 36.843.
[4] ftp://ftp.3gpp.org/tsg_ran/TSG_RAN/TSGR_66/Docs/RP-142229.zip
[5] EP14184600.6
[6] PCT/2014/078087
[7] PCT/2014/078093
[8] PCT/2014/079338
[9] PCT/2014/077447
[10] PCT/2014/077396
[11] PCT/2014/079335

What is claimed is:

1. Circuitry for an infrastructure equipment forming part of a mobile communications network, the circuitry comprising:

transmitter circuitry configured to transmit signals to one or more communications devices via a wireless access interface within a radio coverage area of the infrastructure equipment;

receiver circuitry configured to receive signals from the one or more communications devices via the wireless access interface within the radio coverage area of the infrastructure equipment; and controller circuitry for controlling the transmitter circuitry and the receiver circuitry to transmit or to receive the signals via the wireless access interface to transmit or to receive data represented by the signals, the controller circuitry configured with the receiver circuitry and the transmitter circuitry to:

receive a first indication of a received signal quality of a beacon signal received by an out-of-coverage communications device that is out-of-coverage of the infrastructure equipment, the beacon signal having been transmitted by one or more in-coverage communications devices of one or more the communications devices which can act as a relay node for the out-of-coverage communications device;

receive a second indication of a received signal quality of a beacon signal transmitted by an out-of-coverage communications device to the one or more of the in-coverage communications devices;

select one in-coverage communications device to act as a target communications device for the out-of-coverage communications device; and transmit an indication to the selected target communications device to instruct the selected target communications device to act as a relay node for the out-of-coverage communications device via device-to-device (D2D) communication between the out-of-coverage communications device and the selected target communications device.

2. The circuitry according to claim 1, wherein the controller circuitry is configured with the receiver and the transmitter circuitry to receive a relative strength of beacon signals from one or more in-coverage communications devices.

3. The circuitry according to claim 2, wherein the controller circuitry is configured with the receiver and the transmitter circuitry to select the one in-coverage communications device, from the one or more in-coverage communications devices, based on the relative strength of the beacon signals.

4. The circuitry according to claim 1, wherein the controller circuitry is configured with the receiver and the transmitter circuitry to receive the signals, representing the data, from the one in-coverage communications device to act as the target relay node, or transmit the signals to the one in-coverage communications device.

5. The circuitry according to claim 1, wherein in a case that a communications device is in-coverage, the communications device receives a request, to transmit a beacon signal, from an out-of-coverage communications device, and the communications device transmits the beacon signal to the out-of-coverage communications device in accordance with a D2D communications protocol, the communications device having been selected by the infrastructure equipment to act as the target relay node for the out-of-coverage communications device.

6. The circuitry according to claim 1, wherein the controller circuitry is configured with the receiver and the transmitter circuitry to receive the signals representing the data from a first in-coverage communications device acting as a source relay node, the source relay node being within a coverage area of the infrastructure equipment; and transmit signals to the source relay node, the source relay node then forwarding the signals to another communications device.

7. The circuitry according to claim 1, wherein the controller circuitry is configured with the receiver and the transmitter circuitry to compare indications of one or more beacon signals to select the one in-coverage communications device out of a plurality of in-coverage communications devices to act as the target communications device.

8. The circuitry according to claim 1, wherein the controller circuitry is configured with the receiver and the transmitter circuitry to receive a signal quality measurement report from a communications device.

9. The circuitry according to claim 1, wherein the controller circuitry is configured with the receiver and the transmitter circuitry to request communications devices to transmit a D2D synchronization signal to the selected target communications device acting as the relay node.

10. The circuitry according to claim 1, wherein the controller circuitry is configured with the receiver and the transmitter circuitry to request in-coverage communications devices to transmit a D2D synchronization signal.

11. The circuitry according to claim 1, wherein the controller circuitry is configured with the receiver and the transmitter circuitry to instruct communications devices to handover to the selected target communications device acting as the relay node.

12. The circuitry according to claim 1, wherein the selected target communications device acts as the relay node in a case that predetermined conditions are met.

13. The circuitry according to claim 12, wherein the predetermined conditions include a quality of communicating the data received from or transmitted to a first in-coverage communications device.

14. The circuitry according to claim 12, wherein the predetermined conditions include a signal strength of a signal received from a first in-coverage communications device falling below a predetermined threshold.

15. The circuitry according to claim 1, wherein the one or more communications devices perform D2D communication via the wireless access interface.

16. Circuitry for a communications device, the circuitry comprising:
    transmitter circuitry configured to transmit signals to one or more other communications devices via a wireless access interface to perform device-to-device (D2D) communications and to transmit signals via the wireless access interface to an infrastructure equipment of a mobile communications network within a radio coverage area of the infrastructure equipment;
    receiver circuitry configured to receive signals from the one or more other communications devices via the wireless access interface and to receive signals via the wireless access interface from the infrastructure equipment of the mobile communications network within the radio coverage area of the infrastructure equipment; and
    controller circuitry for controlling the transmitter circuitry and the receiver circuitry to transmit or to receive the signals via the wireless access interface to transmit or to receive data represented by the signals, the controller circuitry configured with the transmitter circuitry and the receiver circuitry to:
        receive an indication that the communications device is an in-coverage communications device, being in-coverage of the infrastructure equipment, and to act as a relay node for an out-of-coverage communications device that is out-of-coverage of the infrastructure equipment;
        receive signals from an out-of-coverage communications device via D2D communications, the signals being up-link data for the infrastructure equipment of the mobile communications network, and transmit signals representing the up-link data to infrastructure equipment; and
        receive signals representing down-link data from the infrastructure equipment, and transmit signals representing the down-link data to the out-of-coverage communications device via D2D communications.

17. Circuitry for a communications device, the circuitry comprising:
    transmitter circuitry configured to transmit signals to one or more other communications devices via a wireless access interface to perform device-to-device (D2D) communications and to transmit signals via the wireless access interface to an infrastructure equipment of a mobile communications network within a radio coverage area of the infrastructure equipment;
    receiver circuitry configured to receive signals from the one or more other communications devices via the wireless access interface and to receive signals via the wireless access interface from the infrastructure equipment of the mobile communications network within the radio coverage area of the infrastructure equipment; and
    controller circuitry for controlling the transmitter circuitry and the receiver circuitry to transmit or to receive the signals via the wireless access interface to transmit or to receive data represented by the signals, the controller circuitry configured with the transmitter circuitry and the receiver circuitry to:
        receive signals from an out-of-coverage communications device, that is out-of-coverage of the infrastructure equipment, via D2D communications, the signals being up-link data for the infrastructure equipment of the mobile communications network, and transmit signals representing the up-link data to infrastructure equipment;
        receive signals representing down-link data from the infrastructure equipment, and transmit signals representing the down-link data to the out-of-coverage communications device via D2D communications so as to act as a source relay to the out-of-coverage communications device; and
        subject to predetermined conditions, transmit a request to one or more other in-coverage communications devices or the infrastructure equipment to transmit a beacon signal to the out-of-coverage communications device so that, based upon a signal quality of the beacon signal received from the one or more other in-coverage communications devices, one of the one or more other in-coverage communications devices can be selected to act as a target relay for the out-of-coverage communications device.

* * * * *